March 31, 1925.
J. M. WHITE
LOCKING DEVICE FOR AUTOMOBILES
Filed Jan. 10, 1921
1,531,325
3 Sheets-Sheet 1
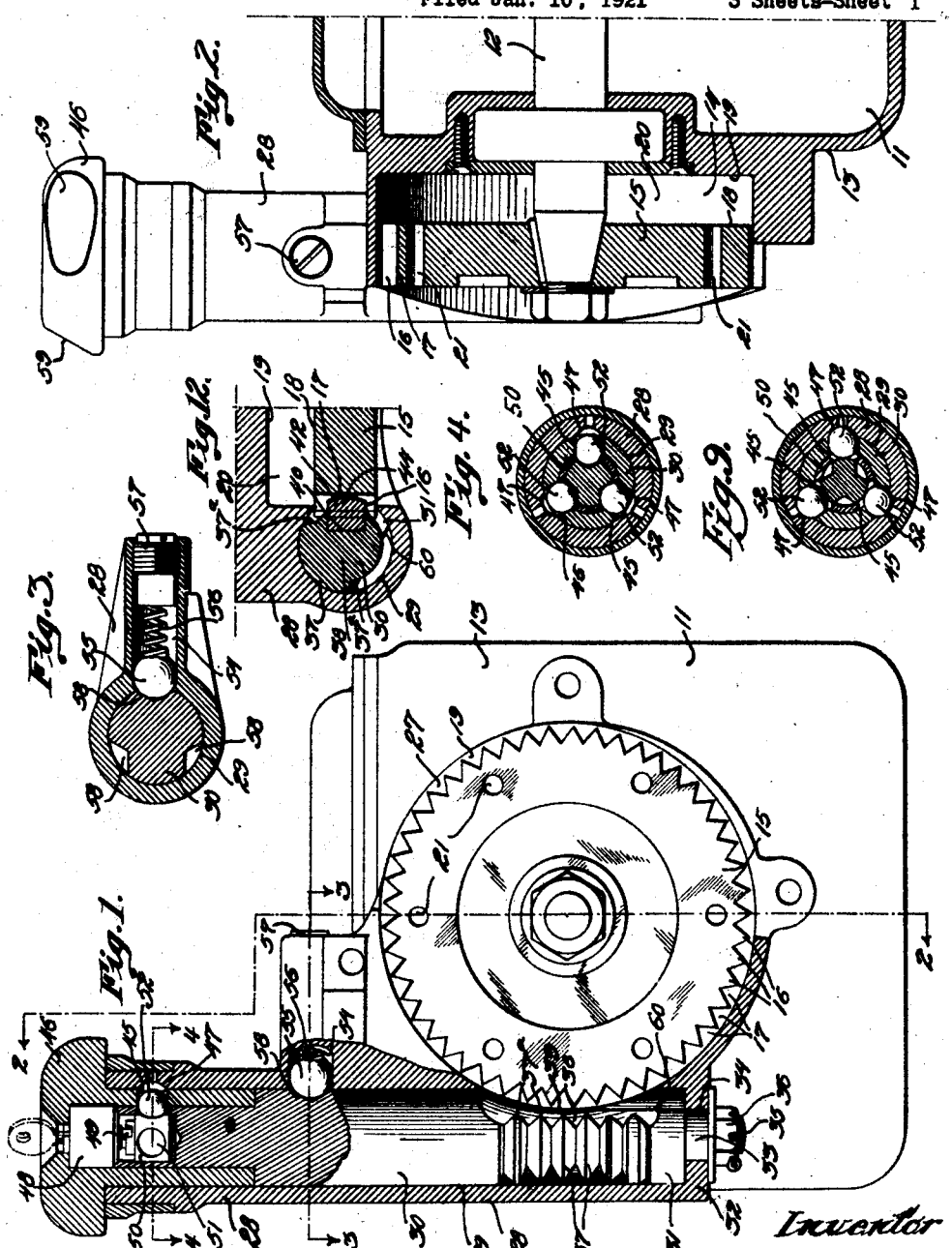
Witnesses
Geo. A. Gruss
Augustus B. Coppes
Inventor
Jessee M. White
By Joshua R. H. Potts
His Attorney March 31, 1925.  J. M. WHITE  1,531,325
LOCKING DEVICE FOR AUTOMOBILES
Filed Jan. 10, 1921   3 Sheets-Sheet 2
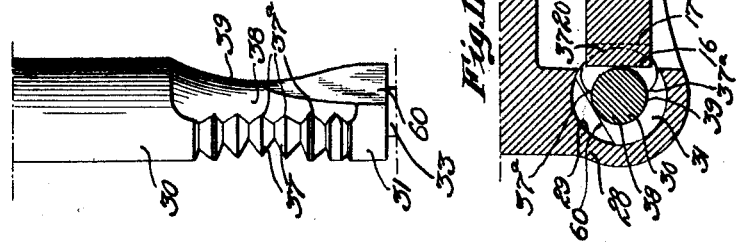
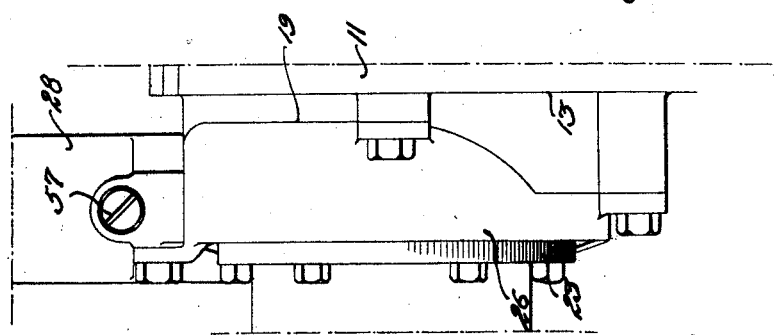
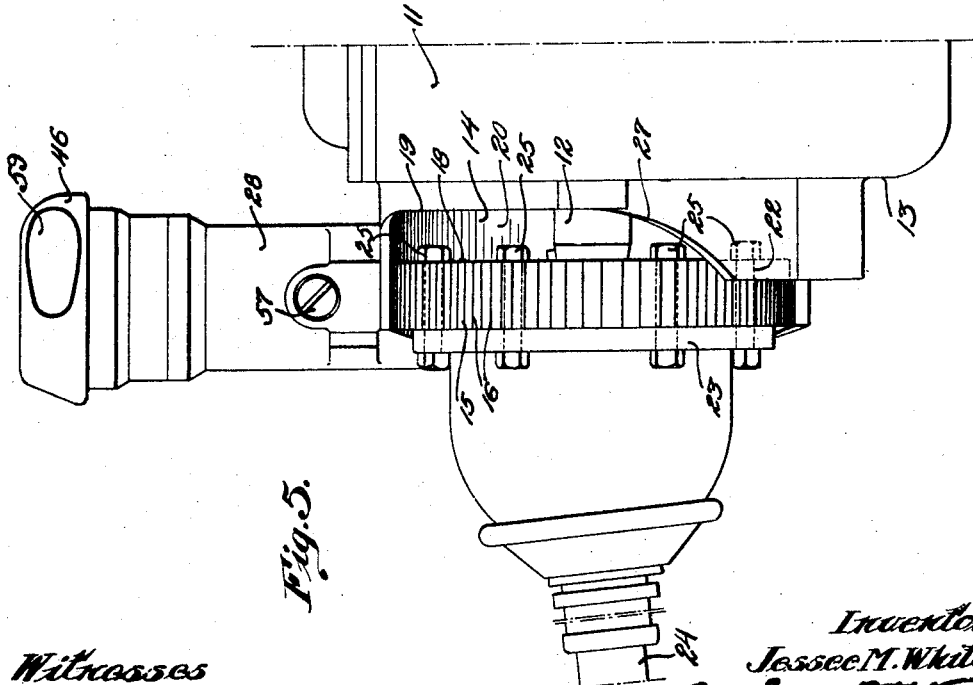

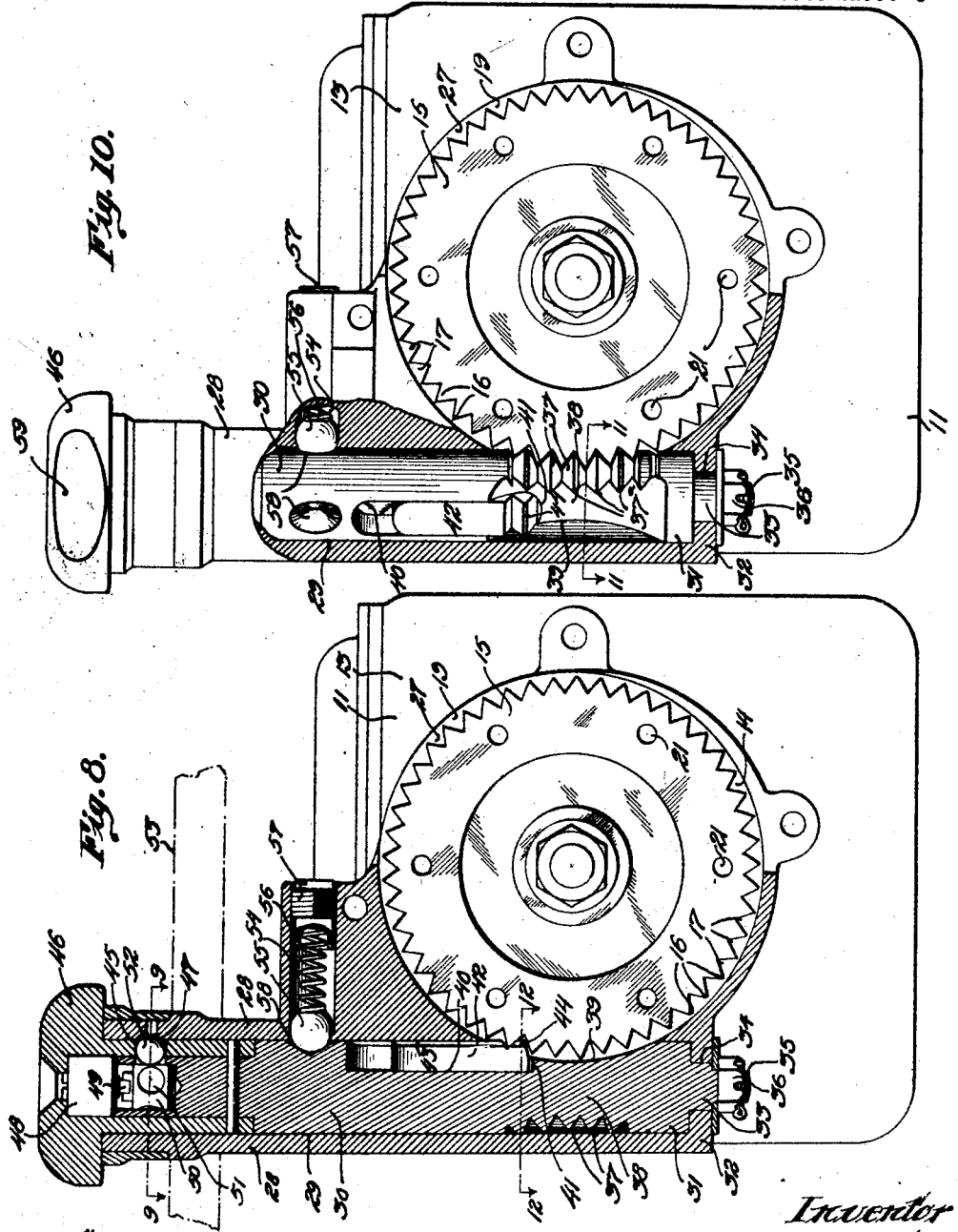

Patented Mar. 31, 1925.

1,531,325

UNITED STATES PATENT OFFICE.

JESSEE M. WHITE, OF PHILADELPHIA, PENNSYLVANIA.

LOCKING DEVICE FOR AUTOMOBILES.

Application filed January 10, 1921. Serial No. 436,077.

*To all whom it may concern:*

Be it known that I, JESSEE M. WHITE, a citizen of the United States, residing at Philadelphia, in the county of Philadelphia and State of Pennsylvania, have invented certain new and useful Improvements in Locking Devices for Automobiles, of which the following is a specification.

One object of my present invention is to provide means of a durable and practical connection for use particularly in connection with automobiles for the purpose of preventing the theft thereof.

Another object is to include in the device of my present invention means which, when moved into a certain position, will effect the locking of the automobile against movement in one direction but which will permit the automobile to be moved in a rearward direction in case it is necessary to bodily move the same in case of fire in a building or the like in front of which the automobile is parked; such requirement being in accordance with the law in many cities especially in the congested districts.

A further object is to make my improved device of a simple construction and design which can be quickly and easily manipulated and operated by an authorized person.

A still further object is to construct my improved device in such manner that it will be practically impossible for a thief to unlock the same.

These objects, and other advantageous ends which will be described hereinafter, I attain in the following manner, reference being had to the accompanying drawings in which—

Figure 1 is an end elevation of my improved locking device shown partly in section and with the guard cover removed, Figure 2 is a sectional view taken on the line 2—2 of Figure 1, Figure 3 is a transverse sectional plan view taken on the line 3—3 of Figure 1, Figure 4 is a transverse section taken on the line 4—4 of Figure 1, Figure 5 is a side elevation of my improved device with the guard cover removed, Figure 6 is a fragmentary elevation of said device with the guard cover in place, Figure 7 is a fragmentary enlarged elevation of a part of the direct locking means which forms a part of my invention, Figure 8 is a view of the same general character as that shown in Figure 1 showing the parts arranged to lock the automobile against movement in a forward direction but which will permit the automobile to be moved in a rearward direction, Figure 9 is a section taken on the line 9—9 of Figure 8, Figure 10 is a view of the same general character to that shown in Figure 8 showing the direct locking means moved into a position to lock the automobile against movement in either direction, Figure 11 is a fragmentary section taken on the line 11—11 of Figure 10, and Figure 12 is a fragmentary section taken on the line 12—12 of Figure 8.

Referring to the drawings, 11 represents the transmission casing of an automobile and 12 is the transmission shaft. I form one end 13 of said transmission casing 11 with a cavity 14; said transmission or drive shaft extending through said end into said cavity and having secured thereon a wheel 15 which has teeth 16 in its peripheral surface; said teeth being tapered outwardly in cross section and providing inwardly tapering notches 17. The inner surface 18 of the wheel 15 is spaced from the inner wall 19 of the cavity 14 to provide a chamber 20 for a purpose hereinafter described. The wheel 15 has holes 21 which, as shown in Figure 5, permit bolts 22 to be inserted therethrough for a purpose of attaching a flange 23 of the universal joint for a driven shaft 24; said driven shaft serving as a continuation of the drive shaft to transmit power in the usual manner to the driving wheels of the automobile. The bolts 22 at one end have heads which are located adjacent the universal joint and at their opposite ends are provided with nuts 25 which serve to secure the flange 23 to the wheel 15; said nuts 25 being positioned within the chamber 20. The bolts 22, being arranged annularly, may be readily tightened or removed when the wheel 15 is capable of being freely turned. However, as will hereinafter be described, when the wheel 15 is locked against rotation it will be practically impossible to detach the nuts 25 which are adjacent the rear of the cavity viewed from Figure 5; it being noted that there is an entrance space 27 leading into the side of the cavity. This entrance space permits entrance of a monkey wrench to remove the nuts 25 when the wheel 15 is free to be rotated to bring the successive bolt nuts near said entrance. If desired a guard cover can be attached as shown in Figure 6 to close the entrance space and exposed part of the wheel 15.

The end 13 of the transmission casing has an integral extension 28 at one side; said extension having a downwardly extending bore 29, the lower part of which communicates with the side of the cavity 14 so that a portion of the teeth 16 of the wheel 15 extends into the bore 29 between its ends. A member 30 rotatably fits the bore 29 and has its lower end 31 resting on the bottom portion 32 of the extension 29; there being a part 33 of the member 30 of reduced diameter which extends outwardly through a hole 34 and is screw threaded at 35 to receive a nut 36 so as to normally hold the member 30 in place within the bore when the parts are unlocked as will be more fully understood from the following description.

It will be understood, however, that the nut 36 performs no necessary function to prevent the removal of the member 30 when the device is in any of its locked positions. The member 30 at a position within its length directly opposite any portion of the wheel 15 which projects into the bore 29 has a number of integrally formed teeth 37 which are arranged at spaced relation within the length of the member 30; said teeth in cross section being substantially similar to the shape of the cross section of the notches 17 in the wheel 15 so that by partway turning the member 30, as for example from the position shown in Figure 1 to the position shown in Figure 10, the teeth 37 will enter the adjacent notches 17 of the wheel 15.

As shown in Figure 11 it will be noted that the teeth 37 are curved in cross section and only extend throughout a portion of the circumference of the member 30. Furthermore it will be noted that the opposite ends 37ᵃ of the teeth 37, as shown in Figure 11, gradually become narrower until they strike the body or core portion 38 of the member 30. These ends of the teeth 37 form a pilot for leading the teeth 37 into the spaces between the teeth of the wheel 15. The core portion 38 is dished out or cut away by the surface 39 so as to clear the teeth 16 of the wheel 15 when the member 30 is rotated into either of the positions shown in Figures 1 and 8; this surface 39 being arcuate and being made to a radius greater than the radius of the wheel 15.

The member 30 has a groove or channel 40 cut therein so as to extend vertical; said groove stopping abruptly at its lower end to provide a shoulder 41. A bolt 42 slidably fits within said groove 40 and is confined between the walls of said groove and the portion 43 of the wall which provides said bore 29. The lower portion of the groove communicates with the cavity 14 when the member 30 is moved into the position shown in Figure 8. The lower end of the bolt 42 has a tooth 44 which will move into one of the notches 17 of the wheel 15 when the member 30 is moved into said latter mentioned position such for example as shown in Figure 8. When in this latter position, the bolt 42 will prevent the wheel 15 from moving contra-clockwise as viewed from Figure 8 but will permit said wheel to move clockwise; this arrangement being obvious for the reason that the bolt 42 cannot move downward beyond the shoulder 41 but may move upward so that the wheel 15 in moving clockwise will keep pushing the bolt upwardly and this clockwise movement of the wheel is the movement which the wheel will assume during backward movement of the automobile. From the construction as illustrated it will be noted that the member 30 can be moved into three principal positions. First, it can be moved into the position so that the surface 39 of the core portion 38 will provide a clearance for the teeth of the wheel 15 as shown in Figure 1 or it can be moved with the teeth 37 entering the notches 17 of the wheel 15 so as to lock the wheel 15 against movement in either direction or it can be moved with the tooth 44 of the bolt 42 entering one of the notches of the wheel 15 so as to permit the wheel 15 to rotate in one direction or to be locked against rotation in the opposite direction.

The member 30 can be locked in any one of said positions or can be unlocked so as to permit the turning into any one of said positions by means of the following mechanism. Adjacent the top the member 30 has three holes 45 which extend radially substantially at 120° apart as clearly shown in Figures 4 and 9. These holes during the rotation of the member 30 by means of a knob handle top 46 can be moved into register with any one of three recesses 47 in the top portion of the extension 28 of the casing.

A key-operated selective lock 48 is mounted in the knob handle 46 and may be of the pin type which includes a spindle 49 which can be rotated when the proper key is inserted and turned within the lock. A cylinder 50 is rotatably mounted within a cavity adjacent the top of the member 30; said cylinder having three holes 51 which are radially disposed at substantially 120° apart and are capable when the cylinder 50 is turned through the medium of the spindle 59 and key to register and communicate with any of the holes 45 in the member 30.

Metallic balls 52 are arranged to occupy spaces so as to have portions in the holes 45; said balls being of such size that their diameters are greater than the lengths of the holes 45 so that a portion of the balls must also extend either into the recesses 47 in the casing extension 28 or into the holes 51 in the cylinder 50. Thus it is obvious that if the cylinder 50 is turned by the proper key within the lock 48 so as to move the holes 51 out of register with the holes 45, the outer surface of the cylinder will push the balls 52 so that a portion of said balls will project into the recesses 47 and thereby lock the member 30 against movement relatively to the casing extension 28. If, on the other hand, the cylinder 50 is moved through the medium of the lock key so that the holes 51 will register with the holes 45, the member 30 can be rotated by a person grasping the knob handle 46; said extension 28 preferably being of such height that the knob handle will be positioned above the floor of the automobile which is indicated in dot-and-dash lines at 53 in Figure 8.

It is important that the driver should be able to readily ascertain, at any time, which of its three positions relatively to wheel 15 the rotatable locking member then occupies, and that means should be provided for automatically arresting the rotation of locking member 30 when it reaches its half lock, lock or no lock position. For these purposes I provide the casing extension 28 with a transverse bore 54 in which is mounted a ball 55, backed by a spring 56 and a plug 57 screwed into the bore, and provide locking member 30 with three depressions 58, preferably frusto-conical, into which the spring may press the ball. These depressions are so positioned that the ball will take into one depression when member 30 reaches its locking position, into another depression when said member 30 reaches position for half lock, and into the third recess when member 30 reaches its position for no lock. If member 30 is in its inactive position, a partial rotation will bring it to half-lock position and the ball will yieldingly arrest the rotation at the precise point required for the half lock. The driver may then turn cylinder 50 to lock member 30 in that position, or he may continue the rotation another step and the rotation will again be arrested when locking position is reached. The spring-pressed ball acts primarily as a position finder and the driver's sense of touch informs him when member 30 is in one of its three required positions. By placing markings upon knob handle 46 to indicate the three positions, the driver may ascertain, at a glance, the exact condition of the locking mechanism. These markings may be conveniently placed upon flat parts 59 of the knob handle.

As previously stated, the nut 36 is not necessary as means for preventing the removal of the member 30 when the device is locked since it will be noted that the balls 52 when projecting partway within the recesses 47 will lock the member 30 against upward movement relative to the casing extension 28 as well as to lock the member 30 against rotation.

If it is desired to remove the member 30 for purpose of repair or the like, it can be readily done by inserting the key and turning the cylinder 50 until the holes 51 register with the holes 45, after which the nut 36 can be removed and the bottom of the member 30 is provided with an additional cut-out portion 60 such as shown in Figures 1 and 7; said cut-out part 60 permitting the lower end portion of the member 30 to clear the teeth of the wheel 15 to allow the removal of said member 30.

It will thus be noted that my improved locking device is operative to lock the drive shaft to the gear casing and that the structure of the device is positive in its action and sufficiently strong to hold the parts in their locked position.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination of a casing having a bore; a notched wheel; a member rotatably mounted in said bore and having a sectoral toothed portion movable into engagement with the notches of said wheel when said member is rotated, said member carrying a slidable bolt movable when the member is turned into another position, to engage with the notches of the wheel to permit the wheel to rotate in one direction but to lock it against movement in an opposite direction; and means for locking said member against movement when in either of said positions; substantially as described.

2. The combination of a casing having a bore; a notched wheel; a member rotatably mounted in said bore and having a sectoral toothed portion movable into engagement with the notches of said wheel when said member is rotated, said member having a groove terminating at one end in a shoulder; and a bolt slidably held in said groove and having a toothed portion movable when said member is turned into another position to engage the notches of said wheel whereby the wheel will be locked against rotation in one direction owing to the jamming of the bolt between the wheel and said member, said bolt, when the wheel is rotated in an opposite direction, being operative to slide in said groove out of the path of the wheel; substantially as described.

3. The combination of a casing having a bore; a notched wheel; a member rotatably fitting said bore and having a portion movable, when the member is turned, to intercept said wheel and lock it against rotation in either direction; and a bolt carried by said member and being selectively movable, when said member is turned into mesh with the notches of said wheel, said bolt being slidable in one direction by said wheel out of its path when the wheel is turned in one direction, said bolt when the wheel is turned in an opposite direction, serving to jam between the wheel and said member and thereby stop the movement of the wheel in said latter direction; substantially as described.

4. The combination of a casing having a bore; a notched wheel; a member rotatably fitting said bore and having a portion movable, when the member is turned, to intercept said wheel and lock it against rotation in either direction; and a bolt carried by said member and being selectively movable, when said member is turned, into mesh with the notches of said wheel, said bolt being slidable in one direction by said wheel out of its path when the wheel is turned in one direction, said bolt when the wheel is turned in an opposite direction, serving to jam between the wheel and said member and thereby stop the movement of the wheel in said latter direction, said member having a cut-out portion adapted to be turned, to the exclusion of said bolt and first mentioned portion, into a position opposite but free of the wheel whereby the latter can turn in either direction; substantially as described.

5. The combination of a casing having a bore; a driving member; a locking member rotatably fitting said bore and movable into various positions to lock said driving member under different conditions, said second mentioned member having holes therein, said casing having recesses therein; balls adapted to fit in said holes so that some portions thereof will fit in said recesses and thereby lock the second mentioned member to said casing, said second mentioned member having a cylinder therein with holes movable into registry with said first mentioned holes; and a lock having a portion operative by selective means for turning said cylinder to effect registration of the holes therein with said first mentioned holes whereby the balls can move out of said recesses and free said second mentioned member from the casing; substantially as described.

6. The combination of a casing having a bore and a cavity communicating with the bore within its length; a notched wheel within said cavity; a member rotatably fitting said bore and having a cut-out portion normally clearing said wheel, said member having teeth operative when the member is turned to engage within the notches of said wheel; a member carried by said first member and selectively moved into a position to engage the notches of said wheel, said second mentioned member, when the wheel moves in one direction, serving to jam between the wheel and said first member, said second mentioned member being movable out of the path of said wheel when the latter moves in an opposite direction; and means for locking said first member in any of said positions; substantially as described.

7. In a locking device for automobiles, the combination of a casing having a bore; a driving shaft; a notched member fixed to the shaft; a locking member rotatably mounted in the bore of the casing and having a sectoral toothed part adapted to engage with the notched member and a cut away part adapted to clear the notched member; means for rotating the locking member, and means for locking it in or out of engagement with the notched member.

In testimony whereof I have signed my name to this specification in the presence of two subscribing witnesses.

JESSEE M. WHITE.

Witnesses:
  AUGUSTUS B. COPPES,
  CHAS. E. POTTS.